United States Patent [19]

Smith

[11] 4,088,463
[45] May 9, 1978

[54] FILTRATION MODULE

[75] Inventor: Irwin M. Smith, Grand Rapids, Mich.

[73] Assignee: Frederick L. Fichter, Grand Rapids, Mich.

[21] Appl. No.: 683,292

[22] Filed: May 5, 1976

[51] Int. Cl.² .......................................... B01D 46/00
[52] U.S. Cl. .................... 55/480; 55/385 A; 55/502; 55/504; 55/505; 55/511; 55/DIG. 29; 98/40 D
[58] Field of Search ................. 55/483, 484, 495, 497, 55/511, 501, 502, 494, 504–506, 385 A, 350, 480, DIG. 29, DIG. 31; 98/36, 40 D

[56] References Cited

U.S. PATENT DOCUMENTS

| | | | |
|---|---|---|---|
| 1,598,097 | 8/1926 | Mathis | 55/505 X |
| 2,886,124 | 5/1959 | Scharmer | 55/484 X |
| 3,323,437 | 6/1967 | Knab | 98/40 D |
| 3,341,013 | 9/1967 | Moulton | 55/502 X |
| 3,423,908 | 1/1969 | Hart | 55/484 X |
| 3,522,724 | 8/1970 | Knab | 98/40 D X |
| 3,553,941 | 1/1971 | Wittemeier et al. | 98/40 D |
| 3,721,067 | 3/1973 | Agnew | 55/484 X |
| 3,760,568 | 9/1973 | Neumann et al. | 55/502 X |
| 3,828,530 | 8/1974 | Peters | 55/502 X |
| 3,870,490 | 3/1975 | Landy | 55/502 X |

*Primary Examiner*—Frank W. Lutter
*Assistant Examiner*—Kathleen J. Prunner
*Attorney, Agent, or Firm*—Glenn B. Morse

[57] ABSTRACT

The filtration module is adapted to be installed in groups occupying all or a substantial portion of a wall or ceiling area in a room. The filter elements are replaceable from inside the room without disassembly or removal of the housing structure. The filter elements are held in secure sealing relationship against recessed edge surfaces by an easily removed retaining frame normally secured to the housing with fastenings accessible from within the room.

2 Claims, 7 Drawing Figures

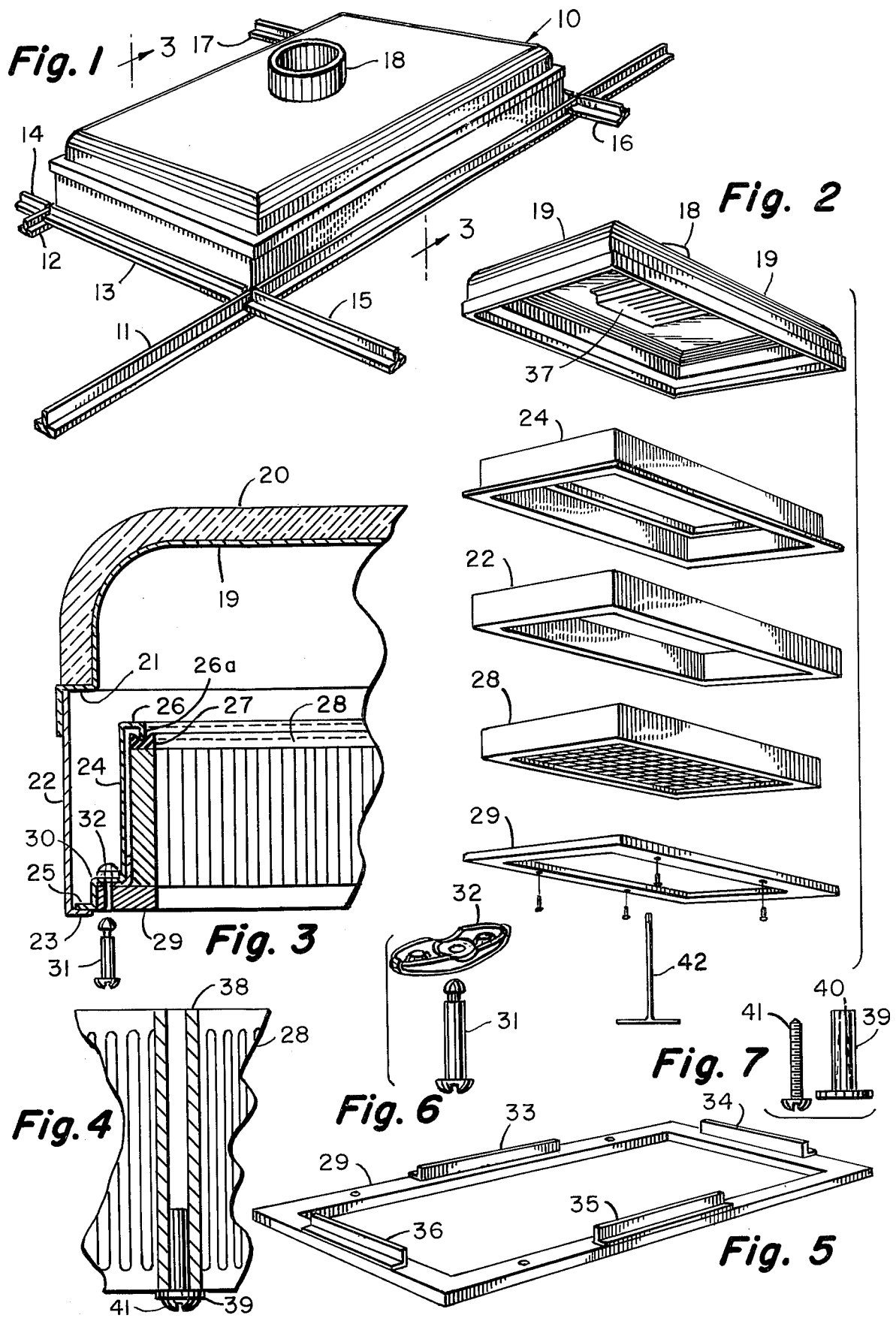

FILTRATION MODULE

BACKGROUND OF THE INVENTION

Many industrial and research projects require that certain procedures be performed in a so-called "clean room" environment. The objective here is to eliminate all dust particles that might carry contamination with them, or themselves interfere with the operation of delicate instruments. Essentially, a "clean room" is merely a room equipped with a highly effective filtration system. It has become standard practice to design these filter installations so that the ceiling area of the room is occupied by a large number of filtration modules that are fed from a common duct or plenum. Air is delivered into the room via the system, and withdrawn through a conventional exhaust outlet adjacent the floor. This type of installation is sufficiently common to have generated a relatively standard form of replaceable filter element. These are rectangular in configuration, and usually have an edge frame provided with a sealing gasket that can be pressed against an abutment surface on the module housing to generate a sufficiently tight seal to assure that all of the air entering the room passes through the filter, rather than around it.

The filter elements must be replaced frequently as they become loaded with entrapped materials. The module structures in most common use at present are adapted for the installation of the filter elements from above, so that they are dropped into position and held down against a retaining flange defining an opening through which the air through the filter enters into the room. This arrangement presents a problem, in that the access to the filter modules from above is very inconvenient, with the alternative being the removal of the entire module so that access to the top can be obtained. Whenever ducting is connected and disconnected, or disturbed by jostling, there is an increased risk of contaminating the air of the room during the filter-changing process. If this occurs, the filtration equipment must necessarily be run for a long enough period to purge the room before the room can be used for its special purpose. The time factor involved in such a replacement procedure is obviously very substantial, and blocks the use of the room during this period.

SUMMARY OF THE INVENTION

The housing of a module embodying the present invention is provided with a recessed thin abutment engaging the periphery of the filter element in the installed position. The element is pressed against this abutment by a retaining frame. This inner abutment and a shelf on the housing receiving the retaining frame are preferably disposed to provide for a substantially continuous flush surface across the group of modules, except for a slight offset where the retaining frame overlaps the filter element. The filter element is received to a position within the housing past the surfaces that support the retaining frame. The surfaces supporting the filter element and the retaining frame are preferably provided by a wall spaced inwardly from the outer shell of the housing.

DESCRIPTION OF THE DRAWINGS

FIG. 1 is a perspective view from above, showing a filter module installed in a grid of beams forming the ceiling of a clean room.

FIG. 2 is an exploded view showing the components of the filter module illustrated in FIG. 1.

FIG. 3 is a sectional elevation on an enlarged scale over that of FIGS. 1 and 2, and illustrating the assembled relationship of the components.

FIG. 4 is a sectional elevation on an enlarged scale over that of FIG. 3, showing the access opening normally provided in the central area of a filter element for manipulation of an air flow control damper.

FIG. 5 is a perspective view showing the retaining frame of the assembly appearing in FIG. 2.

FIG. 6 is an enlarged perspective view showing the components of the disengagable fastener normally securing the retaining frame in position.

FIG. 7 is a sectional elevation showing the components of a plug removably inserted in the central access tube appearing in FIG. 4.

DESCRIPTION OF THE PREFERRED EMBODIMENT

Referring to FIG. 1, the filtration module generally indicated at 10 is supported (together with a group of others like it) by a grid work of ceiling beams having a T-shaped configuration in cross-section. The modules rest on the horizontal flanges of these beams, and are located laterally by the vertical flanges as shown in FIG. 1. The parallel beams 11-12 are continuous in this particular installation, and the short intercostal beams 13-17 extend between and bridge across the adjacent continuous beams. The ends of the short beams may be offset, if desired, so that the bottom surfaces are coplanar with the bottom surfaces of the continuous beams 11-12. The duct connection 18 is adapted for association with a common air-delivery pipe or plenum, which may serve one or more of these modules.

The structure of the modules is best shown in FIG. 3. The upper section or top of the shell or housing is indicated at 19, which is preferably insulated as shown at 20 to minimize condensation problems. The offset shown at 21 brings the side panel or wall 22 of the housing approximately flush with the outer surface of the insulation. The horizontal in-turned flange 23 at the bottom of the side panel 22 forms a shelf supporting the inner wall 24 defining a rectangular opening in the housing. Each inner wall 24 has an upper, center and lower section. The center section of the inner wall 24 extends in spaced, parallel relation to the corresponding side wall 22. The base flange 25 of this wall rests against the flange 23, and is preferably secured thereto with spot-welding or rivets. The upper section of the inner wall 24 has an inwardly directed flange 26 provided with a downwardly directed flange or edge abutment 26a against which the standard foam-rubber gasket 27 forming the inner surface of the filter element 28 may be pressed by the retaining frame 29 engaging the outer surface of the filter element when the filter element is received in the opening defined by the inner wall 24, in order to maintain a solid sealing engagement assuring that air will flow through the filter element in a direction from top to bottom, as shown in FIG. 3, rather than via leakage paths around it. The thin edge 26a of sheet metal easily deflects the foam-rubber of the gasket with comparatively little pressure, compared to that which would be required if contact were made over the full width of the gasket. The sheet metal can be expected to be of the order of 0.020 to 0.063 inches, compared to a half-inch or more of gasket width.

The lower section of the inner wall 24 includes the outwardly directed horizontal base flange 25 and a stepped portion 30 between the base flange and the vertical center section of the inner wall 24. This stepped portion provides a shelf recessed from the plane of the adjacent edge of the housing defined by the flange 23, and against which the retaining frame 29 can be held by the disengageable fastener assembly 31–32. These fasteners are conventional, and are illustrated on an enlarged scale in FIG. 6. The fastener component 32 is secured directly to the flange 30, which has a series of holes aligned with corresponding holes in the retaining frame 29 to receive the pins 31. The components 32 can be secured either by spot welding or rivets, and the pin 31 is engaged by inserting it through the aligned holes, and locking it with a quarter-turn. The retaining frame 29 is provided with the angular members 33–36, as shown in FIG. 5, for locating the filter element 28 properly with respect to the wall 24 and the inner abutment 26, so that proper clearance for insertion may be preserved without sufficient lateral shift to encourage possible leakage.

It may be necessary occasionally to adjust the standard damper unit 37 normally installed in the upper section 19 of the housing. This should not require the removal of the filter element, and it is conventional to provide an access tube as shown at 38 extending upwardly through the central area of the filter element 28. This tube provides for the insertion of a screwdriver or a special wrench with which the damper unit 37 may be adjusted. When the adjustment has been completed, it is desirable that this passage be closed so that un-filtered air is not admitted into the room. This closure is provided by the standard removable plug assembly shown in FIG. 7. The outer member 39 is of rubber, or some such material, and the central axial bore is reduced in diameter at the inner end as shown at 40. The entrance of the screw 41 into the member 39 expands this inner portion into solid engagement with the inside of the access tube 38, thus functioning as a sealing plug. This is shown installed in FIG. 4. When the plug is removed, the T-wrench 42 (or screwdriver, as the case may be) may be inserted through the tube 38.

I claim:

1. A filtration module for use in a ceiling grid of a clean room, comprising:

a housing of rectangular horizontal cross-section having a top with an opening therethrough for connection to an air supply and vertically extending side walls each terminating at its lower end in a continuous, inwardly directed horizontal flange adapted to be supported on said ceiling grid;

an inner wall adjacent each of said side walls, each said inner wall having an upper, center and lower section, said center section extending in spaced, parallel relation to the corresponding vertical side wall, said lower section having an outwardly stepped portion terminating in an outwardly directed horizontal flange overlying and secured to said horizontal flange of said corresponding side wall, and said upper section terminating in a downwardly projecting flange spaced inwardly from said center section, said housing and said inner walls together comprising an air-tight enclosure between said opening in said top and the opening defined by said downwardly projecting flanges;

a removeable filter element having a rectangular peripheral frame and a deformable gasket extending along the entire periphery of said filter element on the upper face thereof, said filter element being receivable within the opening defined by said center sections of said inner walls with said gasket in sealing engagement with said downwardly projecting flange;

a rectangular retaining frame adapted to underly the lower face of said peripheral frame of said filter element and said stepped portions of said lower sections of said inner walls; and means releaseably securing said retaining frame to said stepped portions.

2. The filtration module of claim 1 further including angular members on the upper face of said retaining frame, said members abutting the side faces of said peripheral frame of said filter element.

* * * * *